Feb. 9, 1943.    W. HOWELL    2,310,697
PICKUP DEVICE FOR AIRPLANES
Filed June 24, 1941    2 Sheets-Sheet 1
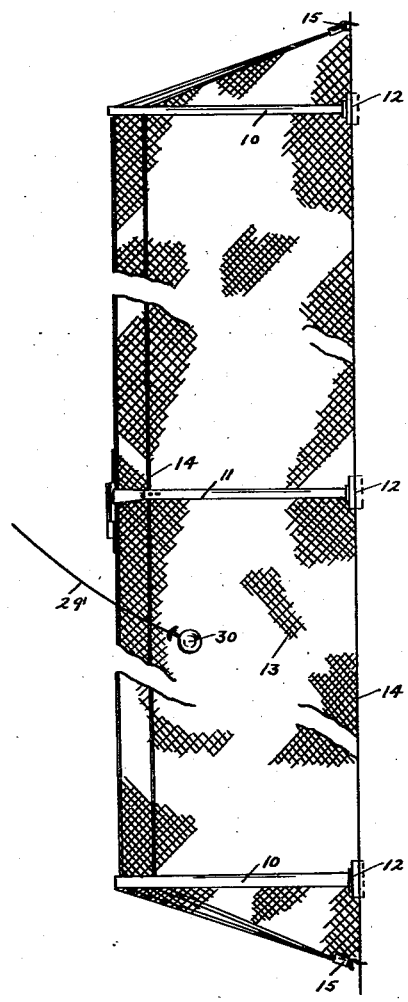
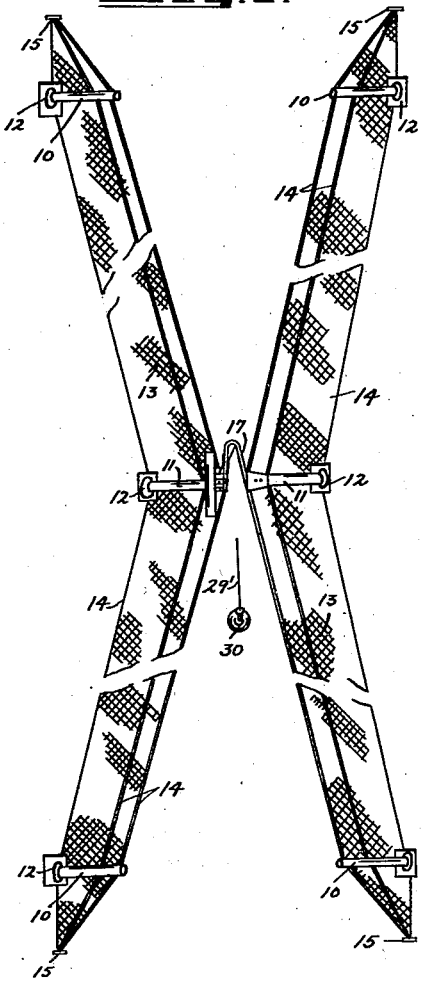
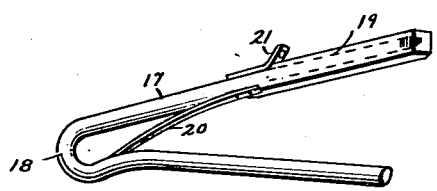
INVENTOR
William Howell
By Ralph Burch
Attorney

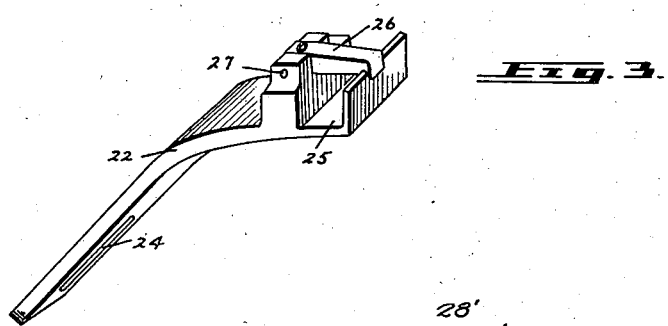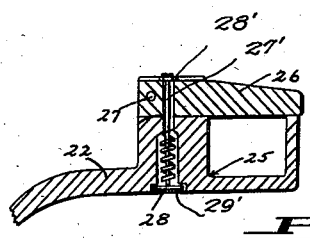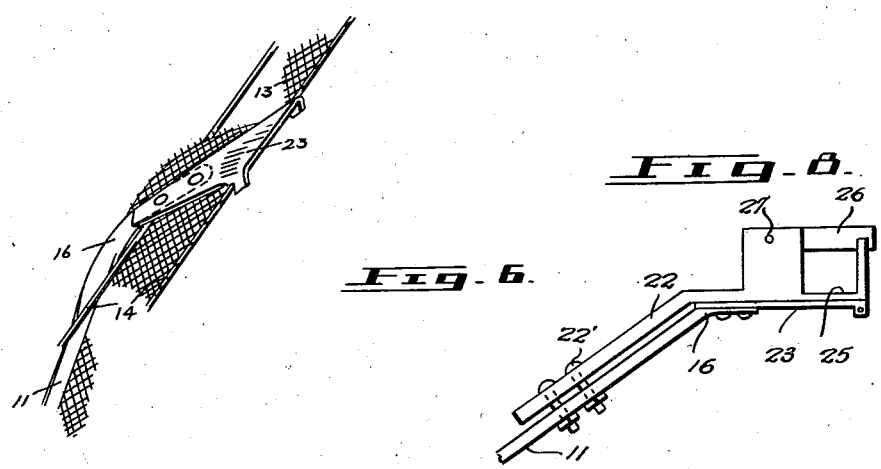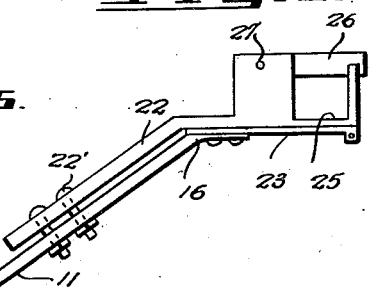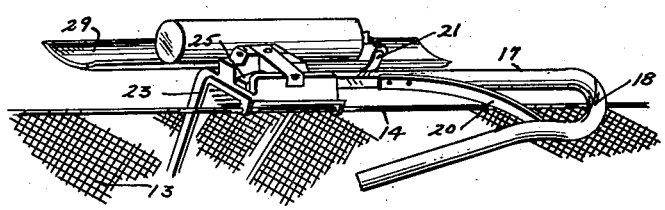

Patented Feb. 9, 1943

2,310,697

UNITED STATES PATENT OFFICE 2,310,697

PICKUP DEVICE FOR AIRPLANES

William Howell, Winnipeg, Manitoba, Canada

Application June 24, 1941, Serial No. 399,535

1 Claim. (Cl. 258—1)

This invention relates to aerial pick-up devices and more particularly to an apparatus whereby mail or like articles may be transferred from the ground to aircraft while the aircraft is in flight thereby eliminating the necessity of the aircraft landing for that purpose.

One important object of the invention is to provide a two way pick-up holder; that is, the pick-up may be reversed in the holder so that an aircraft may approach the pick up and transfer the articles from opposite directions. This is of particular merit as changing wind conditions may affect the flight of the aircraft and it is preferable if not necessary that the aircraft fly against the wind. The chute or guide rails will be erected in line with the prevailing winds. For example on a coast line the chute may be erected at right angles to the coast line and the pick up may be reversed in the holder to take advantage of the winds during the day which are usually reversed in the morning and evening.

Other objects are the provisions of an aerial pick up device which contains very few parts, is durable and comparatively inexpensive.

The device consists of a two way chute or guide which converges to form a narrow throat midway between the extremities of the chute. The holder is located at the throat of the chute and the pick-up disposed in the holder and extending across the throat so that a cable carried by the aircraft will be directed to the throat of the chute and ultimately contact the pick-up and the mail or other articles attached thereto which will be released from the holder and drawn into the aircraft.

With the above noted and other objects in view which may appear as the description proceeds the invention resides in the novel construction, combination and arrangement of cooperating parts as hereinafter more specifically set forth, claimed and shown in the accompanying drawings forming part of this application and in which:

Fig. 1 is a side elevational view of the device.

Fig. 2 is a top plan view of the device.

Fig. 3 is a perspective view of the holder.

Fig. 4 is a perspective view of the pick-up.

Fig. 5 is a mid sectional view of the holder.

Fig. 6 is a fragmentary detailed view of the chute.

Fig. 7 is a perspective view of the assembled holder and pickup together with a mail pouch or the like.

Fig. 8 is a detail side elevational view of the holder.

Referring more in detail to the drawings in which similar reference characters designate corresponding parts throughout the several views it will be seen that the invention provides a two-way chute which consists of upstanding posts 10, at the extremities of each side of the chute and posts 11, midway between the extremities of each side of the chute. The posts are set in a suitable foundation 12 so that they are inclined inward toward each other. In this manner the depending cable from the aircraft will not foul the foraminous material 13, stretched on cables 14 between the aforementioned posts.

The foraminous material 13, is preferably wire screening of any suitable nature such as is used for fences and the like. The cables 14, are stretched tightly between the posts and anchored as at 15 so that the wire screening is held tightly in position.

It will be noted, especially in Fig. 2, that the extremities of the chute are open or in other words the posts at each side are set wide apart and the center posts are set close together to form a throat midway between the extremities. The top end of the center posts 11, are inclined inward at 16, to further narrow the throat at the top thereof.

It is suggested that the chute approximate 180 feet overall and have a height of 35 feet. The posts at each extremity may be advantageously placed approximately 35 feet apart and incline toward each other at an angle of 10 degrees. The center posts may be 12 feet apart and incline toward each other at the same angle and preferably slightly shorter. The portion 16 at the center posts would then be bent more sharply inward to bring the width of the throat to 5 inches. It should be understood that the above dimensions serve only to identify the structure and are not intended to limit the device to any or all of the dimensions.

The foregoing is believed to describe the chute, which while of material importance is not the primary feature of the invention and serves only to direct the depending cable from the aircraft into the throat of the chute where it engages the pick-up device. It should be noted that the chute is constructed so that the pick-up may be engaged from opposite directions and as hereinbefore stated the said chute is erected to take full advantage of the prevailing winds.

Referring particularly to Figs. 4 and 7, it will be seen that the pick-up or the member to which the load is attached and which is contacted by the air craft consists of a metal body 17 bent back on itself at its near center 18. The extremities of the body 17 are spread apart substantially the distance between the most narrow part of the throat.

The stock 19 is square and preferably hollow and is freely supported in the channel of the holder, to be hereinafter described in more detail.

A spring leaf 20 is riveted or otherwise secured to the member 17, and provides a one way entrance into the eye formed by the bent portion at 18. Also secured to the member 17 is a suitable catch or hook 21 by means of which a mail bag or other receptacle is secured to the pickup. It is suggested that the stock 19, be approximately 1 inch square and hollow and the remaining portion of the member 17, be of ⅜" diameter with an overall length of 15". The spread or width is 5 inches or substantially the width of the throat. The above noted dimensions are subject to various modifications according to the dictates of practice.

The pick-up is carried by the holder 22, which is secured by bolts 22' to the top of one of the center posts 11, above the plate 23. A slot 24, in the holder 22, provides means for adjusting the said holder so that the pick up will be properly located across the throat of the chute. The head of the holder is provided with a channel 25, which has a spring pressed dog 26, thereacross. The stock 19 of the pick up member is slidable in the channel 25 and releasably held therein by means of the dog 26 disposed transversely of the channel. The dog 26 is pivotally attached at one end to the holder by means of a transverse pin 27 extending through complementary projecting shoulders on the top of the holder, as seen more clearly in Figs. 3 and 5. The dog 26 and holder are provided with vertically alined openings adjacent the pivot pin 27 adapted to loosely receive a rod 27' suspended from the top of the dog by a washer 28'. The opening through the holder is enlarged to receive an expansion coil spring 28 mounted on the rod 27', one end of the spring having bearing engagement with a shoulder in the opening and the other end being seated on the head 29' on the lower end of the rod. The pressure of the spring on the rod 27' normally pulls the dog downward into frictional engagement with the stock 19 but the dog is capable of slight upward movement to release the stock. A rack 29 is provided to support the mail pouch or suitable container, the rack being welded or otherwise fixedly secured to the holder in parallel spaced relation to the channel portion.

The device operates in the following manner:

The stock 19 of the member 17, is inserted in the slot 25 of the holder in the most advantageous position, that is in one of two directions and the pouch is attached to the pick-up by means of the member 21. The device being so located the aircraft will pass along and above the medium line of the device trailing a weighted cable 29'. The continued movement will draw the cable into the throat of the chute whereupon it contacts the pickup, forces past the spring and is locked therein. The weight 30 is necessarily of such size that it will not slip through the eye portion formed by the curve 18 and the spring 20. The pick-up is then dragged away from the holder together with the receptacle for mail, packages and the like which are ultimately drawn into the aircraft.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

An aerial pick-up device comprising a pair of guide walls converging together intermediate their length to provide a relatively narrow guideway, a holder adjustably attached to one of said side walls adjacent the relatively narrow guideway having a longitudinal channel in its top surface parallel to the guideway, a load carrying member including a rod having a shank adapted to slidably engage in the channel of said holder, the intermediate part of said rod being reversely bent to form a hook bridging the guideway and adapted to receive the depending pick-up cable of the airplane, a dog extending transversely of the channel of said holder pivotally mounted on said holder for vertical swinging movement, a rod depending from said dog extending through an opening in said holder, a spring mounted on said rod for exerting a downward tension on said rod whereby said dog is yieldably held in frictional engagement with the shank of the load carrying member, and a rack mounted on said holder in parallel relation to the channel for supporting the load to be picked up.

WM. HOWELL.